UNITED STATES PATENT OFFICE.

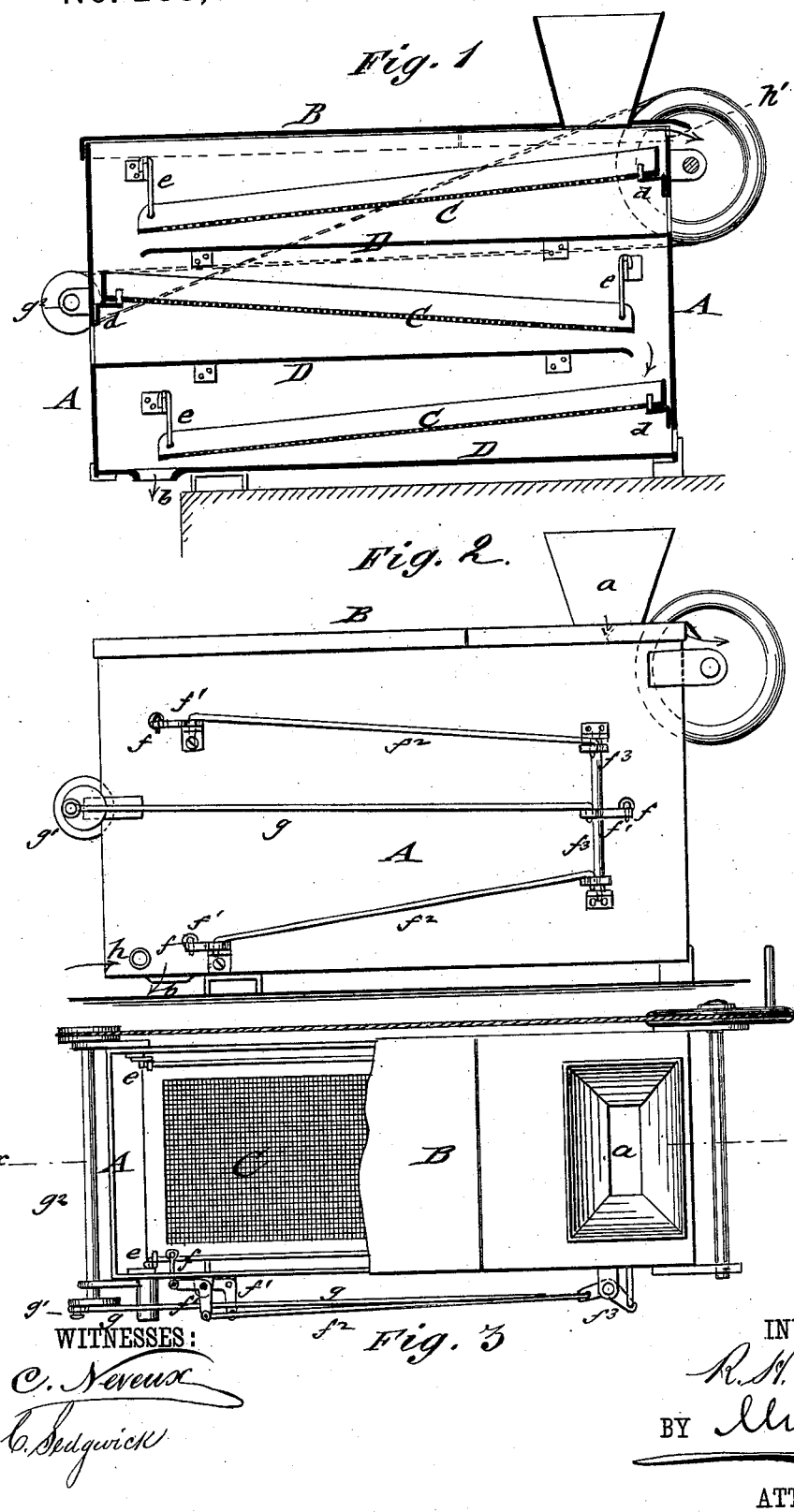

RICHARD H. TIERNAN, OF GALVESTON, TEXAS.

IMPROVEMENT IN GRAIN-DRIERS.

Specification forming part of Letters Patent No. 205,012, dated June 18, 1878; application filed May 18, 1878.

*To all whom it may concern:*

Be it known that I, RICHARD H. TIERNAN, of Galveston, in the county of Galveston and State of Texas, have invented a new and Improved Grain-Drier, of which the following is a specification:

In the accompanying drawings, Figure 1 represents a vertical longitudinal section of my improved grain-drier on line $x\ x$, Fig. 3; Fig. 2, a side elevation, and Fig. 3 a top view of the same with part broken out.

Similar letters of reference indicate corresponding parts.

The object of this invention is to furnish an improved apparatus for drying rapidly all kinds of grain, so as to destroy all bugs, insects, and eggs of the same that may be in the grain, and enabling thereby the grain to be preserved for a longer time.

The invention consists of a sheet-metal box having a series of inclined and laterally-oscillating sieves, in connection with fixed shelves below the sieves, and with a top supply-hopper and a bottom discharge-opening for the grain.

The box or casing is provided near the bottom with an entrance-opening for the blast of hot air, that is forced in opposite direction to the motion of the grain through the apparatus and to the outside by a top opening near the supply-hopper.

Referring to the drawings, A represents a sheet-metal casing or box, whose walls are riveted together in suitable manner, and which is provided with a detachable top, B. The top is divided into two pieces, of which the smaller section is arranged with a hopper, $a$, for the introduction of grain, both being fitted by outer flanges tightly on the upper part of the casing A.

At the interior of the box or casing A are arranged a number of sieves, C, which are alternately inclined in opposite direction, so that the grain supplied from the top hopper $a$ passes from one sieve to the other through the drier, and is discharged from the bottom sieve through a bottom discharge-opening, $b$, to the outside.

The inclined sieves are supported at one end on pivot-pins of central brackets $d$ and hung at the opposite lower ends to pivot-rods $e$, each sieve being connected near the lower part to a lateral rod, $f$, which is connected with a fulcrumed elbow-lever, $f^1$, which are again jointed by connecting crank-rods $f^2$ to fixed elbow-levers of a vertical shaft, $f^3$, that is oscillated by a crank-rod, $g$, and crank-disk connection $g^1$ with a lateral shaft, $g^2$, revolved by belt-and-pulley connection with the driving-shaft of the apparatus. This mechanism produces the lateral oscillating motion of the sieves, and accelerates thereby the passage of the grain from one sieve to the other and through the apparatus.

Below the sieves are arranged fixed sheet-metal shelves D, that serve for the purpose of conducting the blast of hot air that is introduced through an opening, $h$, near the bottom of the casing, and passed in opposite direction to the motion of the grain in a circuitous course from one shelf to the other, and finally out through a top slot, $h'$, that is arranged near the supply-hopper at the diagonally-opposite point to the entrance opening $h$.

The shelves D are just long enough to allow the grain to pass from one sieve to the other, access being furnished to the shelves by means of openings and hinged doors in the end walls of the casing, through which all the dirt that is sifted from the grain can be scraped from the shelves and the bottom to the outside.

The sieves are provided at both sides with raised flanges, so that the grain cannot slip off therefrom.

The drier is set into a brick furnace in such a manner that the exit of the grain will be from one end of the furnace, and the flames play on the bottom of the drier.

In the furnace may be arranged a coil of iron pipe, through which the blast from a suitable fan or blower is driven for being heated up and then passed through the drier, so as to thoroughly dry the grain for destroying insects and preparing it for longer preservation.

Having thus described my invention, what

I claim as new, and desire to secure by Letters Patent, is—

The combination, with a grain-drier having top supply-hopper and bottom discharge-opening, interior oscillating and inclined sieves, and fixed shelves below the sieves, of a bottom entrance and top discharge-opening for admitting the passage of a blast of hot air in opposite direction to the direction of motion of the grain, substantially as and for the purpose set forth.

RICHARD HENESEE TIERNAN.

Witnesses:
L. FELLMAN,
PATRICK TIERNAN.